Nov. 13, 1928.
H. I. BROOKS ET AL
1,691,223
SPRING LUBRICATOR
Original Filed Jan. 15, 1926
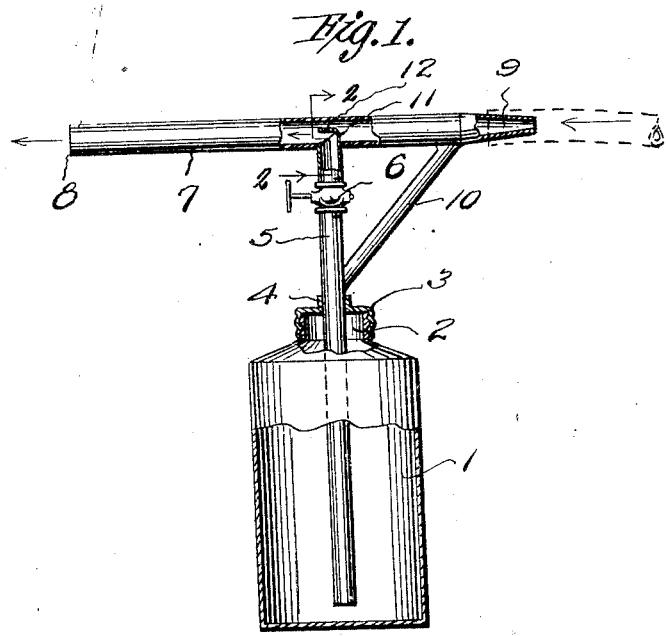
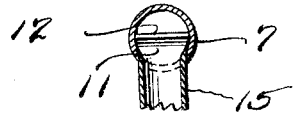
Inventor
Horace I. Brooks
Mack D. Norman
By Richard B. Owen, Attorney
WITNESSES
Guy M. Spring Patented Nov. 13, 1928.

1,691,223

UNITED STATES PATENT OFFICE.

HORACE I. BROOKS AND MACK D. NORMAN, OF DALLAS, TEXAS.

SPRING LUBRICATOR.

Application filed January 15, 1926, Serial No 81,551. Renewed April 2, 1928.

This invention relates to spring lubricators and has for its object the production of a simple and efficient device for spraying the lubricant directly upon the springs of a vehicle, such as an automobile and the like.

Another object of this invention, is the production of a simple and efficient spraying device which may be attached to a desired form of receptacle containing lubricant, for forcing the same therefrom.

Other objects and advantages of the present invention will appear throughout the following specification and claim.

In the drawings:

Figure 1 is a side elevation of the lubricator, parts thereof being shown in section.

Figure 2 is a section taken on line 2—2 of Figure 1.

By referring to the drawings by numerals, 1 designates a receptacle which is provided with a threaded upper end 2, upon which is adapted to be threaded the threaded cap 3. This cap 3 is provided with a reduced extension 4, through which extends lubricant feeding pipe 5, this pipe 5 extending well down into the receptacle 1 as shown in Figure 1.

The feeding pipe 5 carries intermediate its ends a regulating valve 6 for controlling the amount of oil passing through the pipe 5. A spray pipe 7 is supported upon the upper end of the pipe 5 and extends transversely thereof, the spray pipe 7 communicating with the pipe 5 at its top extremity and extending upon either side thereof. The spray pipe 7 is provided with a spraying end 8 and an air inlet end 9, the air inlet end 9 being tapered as shown in the drawing, for the purpose of receiving an air hose or other air supply means. A brace 10 is secured to the feeding pipe 5 near its junction with the cap 3, and the upper end of the brace 10 engages the spray pipe 7 near the tapering air inlet end 9, for supporting the spray pipe 7 at right angles to the feeding pipe 5.

A baffle 11 is carried by the upper end of the feeding pipe 5 and projects vertically through the bore of the spraying pipe 7 for about one half of the diameter of the bore. A lip 12 is carried by the upper end of the baffle 11 and extends at right angles thereto, projecting in the direction of the spraying end 8 of the pipe 7.

By means of the structure above described, it will be seen that by forcing air through the air inlet 9, the lubricant from the container 1 will be drawn up through the feeding pipe 5 and will be sprayed out through the spraying end 8 of the pipe 7. The amount of oil or lubricant passing through the feeding pipe 5, as previously stated may be regulated by means of the valve 6. The lubricant may be sprayed from the spraying end 8 of the pipe 7 in as fine a spray as is desired, by the use of the valve 6. The lip 12 will extend above and in spaced relation to the upper end of the feeding pipe 5 and cause the lubricant mixed with the air to be efficiently forced out through the pipe 7.

It should be understood that any suitable or desired oil may be used, such for instance, the oil discarded from the crank case of an engine, which when mixed with the air will constitute an efficient lubricant for the springs of a vehicle.

It should be also understood that certain changes in mechanical construction may be employed without departing from the spirit of the invention, so long as these changes fall within the scope of the appended claim.

Having described the invention, what is claimed is:

A device of the class described comprising a container for a liquid to be sprayed, a liquid supply pipe extending downwardly into the container, a pipe joined between its ends to the upper end of the first mentioned pipe and in communication therewith, the second mentioned pipe having an air inlet branch at one side of its juncture with the liquid supply pipe and a spray delivery branch at the other side of its juncture with the liquid supply pipe, a baffle extending upwardly from the side of the liquid supply pipe at the side thereof at which the air supply branch of the second mentioned pipe is located and terminating approximately at the axis of the said branch, and a transversely straight lip at the upper end of the baffle extending at right angles therefrom toward the adjacent end of the spray delivery branch of the second mentioned pipe and diametrically of the second mentioned pipe at its juncture with the liquid supply pipe and above the upper end of said supply pipe.

In testimony whereof we affix our signatures.

HORACE I. BROOKS.
MACK D. NORMAN.